INVENTORS
Gordon S. Ley and
John H. Cullom

3,467,916
SLOTTED OPTICAL MASER ACTIVE ELEMENT
Gordon S. Ley, Arnold, and John H. Cullom, Baltimore, Md., assignors to Westinghouse Electric Corporation, Pittsburgh, Pa., a corporation of Pennsylvania
Filed Apr. 23, 1965, Ser. No. 450,473
Int. Cl. H01s 1/00, 3/00
U.S. Cl. 331—94.5                                5 Claims

ABSTRACT OF THE DISCLOSURE

A laser rod having longitudinal slots therethrough but stopped short of the ends of the rod.

---

Figure 1:
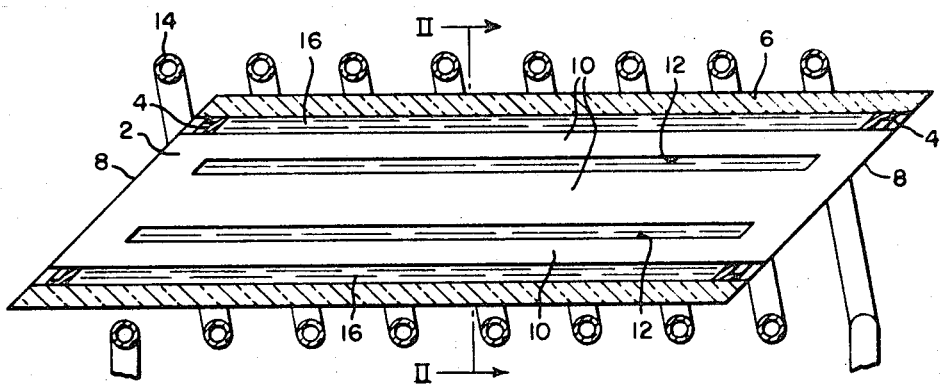

The present invention relates generally to an active element for masers and more particularly to an active element having a plurality of integral individual active element.

The present invention is an improvement upon the optical maser assembly described and claimed in copending application Ser. No. 443,597, filed Mar. 29, 1965, entitled "Maser Assembly" by Coleman J. Miller and assigned to the same assignee as the present invention. As more fully described in the copending application a composite or effective active element for use in a laser system consists of several rods disposed in parallel relationship in a common assembly surrounded by a frequency sensitive absorbing material. The illustrative embodiment described therein advantageously provides a large cross section of active material for absorbing energy at a pump frequency as uniformly as possible across the active material while at the same time limiting the transverse gain of energy at the output frequency to that determined by the diameter of a single rod within the maser assembly.

It has been found, however, that the expense in fabricating a single active element, such as ruby rod, of reduced diameter is approximately equivalent to the expense of fabricating a single active element having a diameter and cross section equal to the composite rod or cluster described by the aforementioned copending application. The small round rods utilized in the copending application are made from approximately the same size boule as a large round ruby rod and consequently each of the small rods cost about the same as one large one.

At the same time the use of a plurality of smaller diameter rods require special care in mounting and properly aligning the crystal axis of each active element in the cluster. The end faces of the several small rods must be properly matched and aligned to obtain useful contribution by each of the individual rods to the overall output energy of the assembly.

Accordingly, an object of the present invention is to provide a maser assembly capable of high power output in an efficient yet inexpensive manner.

Another object of the present invention is to provide an improved fabricated active element for a maser assembly which is readily mounted and aligned for proper operation.

Another object of the present invention is to provide improved fabricated active element for a maser assembly wherein the individual active elements constituting the composite rod or cluster are never physically separated.

Another object of the present invention is to provide an improved fabricated laser rod for a maser assembly wherein the end surface areas are permanently aligned for maximum combined output of the signal energy from the assembly.

Another object of the present invention is to provide an improved fabricated laser rod which can be more readily fabricated and in a less expensive manner than heretofore available.

Briefly, the present invention accomplishes the above cited objects by providing a single, large cross-sectional element of active material such as ruby, wherein slots have been cut through the element resulting in small cross-sectional segments. An important practical feature of the present invention is the extension of the slots short of the ends of the active material rod. In such a manner a multiplicity of small cross-sectional active elements are mounted and maintained in parallel alignment while spaced apart from each other in the transverse direction for allowing the frequency sensitive absorbing material to be interdisposed between each active element. The segments are then never separated and the mechanical problems associated with mounting the one large rod is greatly reduced over mounting and properly aligning the crystal axis and end faces of several small active element rods.

Figure 2:
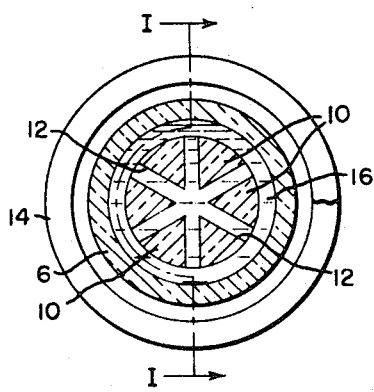

Further objects and advantages of the present invention will be readily apparent from the following detailed description taken in conjunction with the drawing in which:

FIGURE 1 is a longitudinal sectional view of an illustrative embodiment of the present invention taken along the line I—I of FIG. 2; and FIG. 2 is a vertical sectional view taken along the line II—II of the illustrative embodiment shown in FIG. 1.

Referring to FIG. 1, a large diameter rod 2 of active material, such as ruby, is positioned by end plates 4 within a transparent housing 6. The transparent housing 6, such as a quartz or Pyrex tube, abuts the end plates 4 to form a chamber enclosing the ruby rod 2 while allowing the end surface areas 8 to be exposed from the assembly for exit of the energy at an output frequency. The large rod 2 has radial slots sliced therethrough to form a plurality of pie-shaped active segments 10. It is to be noted that the slots 12 extend short of the ends of the ruby rod 2. A pump source 14, such as a helical light source, is disposed around the assembly for transmitting energy at a pump frequency to the plurality of active segments 10. A frequency sensitive absorbing material 16, such as a cladding solution of copper sulfate and glycerine for example, is contained within the chamber formed by the sleeve 6 and end plates 4. The frequency sensitive absorbing material 16 is selected to absorb energy at the output frequency of the system but at the same time allow passage of energy at the pump frequency. As more fully described and claimed in the aforementioned copending application, the transverse gain is limited to the gain of a single segment 10.

The improved fabricated laser rod provides a composite or effective diameter for accomplishing efficient high power pumping in a very economical manner. The cost of the segmented ruby rod 2 of the present invention is considerably less than the multiple ruby rods of the aforementioned copending application since each rod of the aforementioned application is fabricated from approximately the same size boule as the ruby rod 2. Consequently, each of the smaller rods of the copending application cost about the same as the one large rod of the present invention. The cost of machining and slotting the ruby rod 2 is approximately one-half the original cost of the rod itself.

Thus, it is readily apparent that the present invention achieves a desirable laser rod fabrication accomplishing similar objectives and results as those desired in the aforementioned copending application but accomplishes these objectives and results in a less expensive and much simpler fabricated laser rod. The slots automatically eliminate the parasitic circumferential laser modes or whispering modes which circulate around the periphery of the laser rod. At the same time each active element or segment is spaced apart from each other in the transverse direction thereby providing for the disposition of frequency selective absorbing material between the rods to limit the transverse gain of spontaneous radiation or fluorescence between the active segments.

While the present invention has been described with a degree of particularity for the purposes of illustration, it is to be understood that all modifications, substitutions and alterations within the spirit and scope of the present invention are herein meant to be included. For example, the radial slots 12 need not pass completely through the center core of the laser rod 2. While a total of six active segments each of 60° sectors have been shown for the purpose of illustration, it is to be understood that any desired number of segments of chosen sector size may be utilized. Further, the slots cut into the active material rod 2 need not be radial but may be of any suitable geometrical disposition to divide the rod 2 into suitable active elements which will have substantially the same cross-sectional area and periphery.

We claim as our invention:

1. In a maser assembly the combination comprising: an elongated active element having slots extending lengthwise within the elongated element but short of its ends; frequency selective means disposed within said slots for absorbing transverse radiation; and means for containing said frequency selective means within said slots.

2. In a laser rod assembly wherein a plurality of elongated active segments are parallelly disposed and spaced apart from each other for the purpose of inserting absorbing means therein between to reduce transverse radiation and hence transverse gain of the assembly at the laser output frequency, the combination comprising a single laser rod having radial slots therein separating pie-shaped segments; said slots stopping short of the ends of said laser rod; the ends of said rod being integral with each said active segment whereby mounting and proper alignment of the active segments and their end faces are readily facilitated.

3. A cluster of active elements for a laser apparatus comprising in combination; a laser rod having a plurality of elongated pie-shaped active segments each transversely separated by radial slots extending through the laser rod; said slots extending short of the ends of said laser rod.

4. In a maser apparatus, an active material comprising: a cylindrical rod of active material having slots extending lengthwise therein, but short of its ends, and forming a plurality of laterally spaced apart adjacent sections between the ends of said cylindrical rod, each section having a cross section substantially smaller than the total; each said section serving to amplify emission stimulated within said material.

5. The apparatus of claim 4 wherein each of said sections is pie shaped.

No references cited.

RONALD L. WIBERT, Primary Eaminer

U.S. Cl. X.R.

330—4.3